United States Patent [19]

Robbins

[11] Patent Number: 5,294,303
[45] Date of Patent: Mar. 15, 1994

[54] METHOD FOR REMOVING DISSOLVED IMMISCIBLE ORGANICS FROM AM AQUEOUS MEDIUM AT AMBIENT TEMPERATURES

[75] Inventor: Lanny A. Robbins, Midland, Mich.

[73] Assignee: The Dow Chemical Company, Midland, Mich.

[21] Appl. No.: 987,941

[22] Filed: Dec. 8, 1992

[51] Int. Cl.$^5$ .......................... B01D 3/10; B01D 19/00
[52] U.S. Cl. .......................... 203/10; 202/205; 203/14; 203/91; 203/94; 203/98; 203/DIG. 4; 203/49
[58] Field of Search ...................... 203/10, DIG. 4, 49, 203/98, 91.14, 11, 94; 202/205; 55/50, 53, 55; 210/DIG. 5

[56] References Cited

U.S. PATENT DOCUMENTS

| | | | |
|---|---|---|---|
| 2,127,004 | 8/1938 | Nelson | 203/DIG. 4 |
| 3,486,985 | 12/1969 | McGrath | 203/24 |
| 3,898,058 | 8/1975 | McGill | 55/50 |
| 4,014,751 | 3/1977 | McCord | 203/2 |
| 4,236,973 | 12/1980 | Robbins | 203/10 |
| 4,278,502 | 7/1981 | Stevens et al. | 203/DIG. 4 |
| 4,308,106 | 12/1981 | Mannfeld | 203/19 |
| 4,390,396 | 6/1983 | Koblenser | 202/170 |
| 4,399,000 | 8/1983 | Tedder | 203/DIG. 4 |
| 4,585,524 | 4/1986 | Hoiss | 203/11 |
| 4,713,089 | 12/1987 | Robbins | 203/10 |
| 4,966,654 | 10/1990 | Carberry | |
| 4,985,122 | 1/1991 | Spencer | 203/DIG. 4 |
| 5,124,004 | 6/1992 | Grethlein et al. | 203/DIG. 4 |

FOREIGN PATENT DOCUMENTS 0495444  1/1977  Australia .................... 203/DIG. 4

OTHER PUBLICATIONS

H. R. Null, "Heat Pumps in Distillation", CEP, Jul. 1976, pp. 58–64.
R. Danziger, "Distillation Columns with Vapor Recompression", CEP, Sep. 1979, pp. 58–64.

Primary Examiner—Virginia Manoharan

[57] ABSTRACT

A process is provided for separating trace amounts of water-immiscible, volatile organic liquids dissolved in aqueous media whereby the aqueous media are subjected to vapor stripping under vacuum at about ambient temperature in conjunction with a heat pump which indirectly recovers the energy of vaporization in its cold loop and returns such energy to the vaporization of the aqueous media in its hot loop. Inasmuch as the entire process is conducted at ambient temperature, there is little loss of energy to the environment and processing energy is recovered and reused to the application of a heat pump system.

6 Claims, 4 Drawing Sheets

METHOD FOR REMOVING DISSOLVED IMMISCIBLE ORGANICS FROM AM AQUEOUS MEDIUM AT AMBIENT TEMPERATURES

BACKGROUND OF INVENTION

This invention relates to a method for separating trace amounts of water-immiscible, volatile organic liquids from an aqueous medium wherein the organics are dissolved. The invention is further directed to achieving these objects at about ambient temperature for the aqueous medium. The invention is especially useful for removing trace amounts of organic contaminants from groundwater and process streams.

U.S. Pat. No. 4,713,089 describes a stripping method for removing volatile organic liquids from aqueous media by in situ generation of water vapor utilized as a stripping gas under vacuum. Overhead vapors from the stripping column are compressed to liquefy most of the overhead vapors to produce a condensate containing water, water-immiscible liquid organics and some noncondensable components. The organics coalesce to provide a separate decantable organic phase.

A major limitation in the application of this method is the relatively large compressor required to compress vapor volumes to maintain stripping efficiencies in the stripping column.

SUMMARY OF INVENTION

The present invention includes several process embodiments. As a process in the art of stripping trace components from aqueous dispersions, the invention comprises subjecting an aqueous dispersion containing a dissolved quantity of one or more water-immiscible, organic liquid having differentiated densities relative to water to a sequence of processing conditions at about ambient temperature to separate organic liquids and water phases. Aqueous dispersions processed in accordance with the invention include true solutions of trace amounts of water-immiscible, organic liquids as well as dispersions in which the organic solute is present in an amount sufficient to constitute a distinct or discontinuous phase in the dispersion. The invention is capable of efficiently reducing to very low levels dissolved water-immiscible, liquid organics in water. It may also be applied to dispersions containing larger amounts of the organic phase. Optionally, it is used conjunctively and in sequence with other unit operations for separating water and liquid organics.

Organic liquids contemplated for separation are those which exist in liquid form at ambient temperatures in the range of 0° to 60° C. Densities are differentiated when the organic liquid has a density relative to water of either less than or greater than 1 sufficient to readily separate from water to form a liquid layer distinct from the aqueous dispersion. Preferably, differentiation in density (specific gravity at 20° C.) is at least about 0.01.

In the practice of the invention, pressure on the aqueous dispersion is reduced sufficiently to cause it to boil at ambient temperature, thus producing a dispersion vapor stream. Energy of vaporization is supplied from the hot side of a heat pump which is simultaneously recovering energy in its cold loop from condensing vapors. The resulting vapor stream is contacted counter-currently with a flowing liquid stream of the aqueous dispersion from which the organic liquid is to be removed. Counter-current contacting may be readily accomplished in horizontal or inclined multi-stage contactors but is conveniently conducted in an essentially upright packed column in which the vapor rises against the downflowing aqueous dispersion. Vapor effluent from the counter-current, liquid vapor contacting zone enriched in the organic phase to be separated is passed into a condensing heat exchanger, which is cooled below ambient temperature on its cold side by a cooling fluid. This cooling fluid may be a vaporizable refrigerant or a heat transfer fluid that has been remotely cooled by the vaporizable refrigerant. In both cases the refrigerant is recirculated through the cold side of the heat pump.

In the complete energy cycle, heat is indirectly recovered from the condensing tower vapor effluent below ambient temperature and reused through indirect heat exchange with dispersion bottoms to generate stripping vapors as the dispersion is maintained under reduced pressure sufficient to cause boiling at ambient temperatures.

After condensing most of the tower vapors, the resulting liquids are passed into a three-phase separation system which allows organic and aqueous layers to separate into distinct layers positioned one above the other by their relative densities. Noncondensable components that may have been dissolved in the aqueous feed, e.g., air and other dissolved gases are vented, filtered or trapped by a suitable gas adsorbent.

Since the vacuum necessary for maintaining the aqueous dispersion at a boiling pressure is maintained with reduced gas throughput as a result of partially condensing dispersion vapors, the vacuum pump size and capacity are minimized relative to a given volume of stripping vapor. Relatively, for a given volume of dispersion feed, the fluid refrigerant recirculating compressor is much smaller in volumetric displacement than the tower vapor compressor used in U.S. Pat. No. 4,713,089.

In one embodiment, the process is conducted in a packed vacuum column whose axis is approximately vertical. The aqueous dispersion feed containing dissolved organic liquid characterized by a density less than one is introduced near the top of the column from which it descends downwardly under gravity to contact rising vapor from the boiling dispersion. The contact zone containing commercial, gas-liquid contacting ceramic saddles is of sufficient length to achieve a desired theoretical vapor stripping of the dissolved organics to enrich the vapor phase in organic content. Preferably the organics to be removed have a relative volatility exceeding 100, and most preferably exceeding 1,000. In such configuration, the overhead vapor effluent is passed into a shell and tube heat exchanger which is cooled on the tube side by a vaporizing refrigerant. The refrigerant vapor exiting the overheads condenser is subsequently compressed and passed through a heat exchanger in contact with dispersion bottoms. The compression and heat removal condenses the refrigerant vapors. As the compressed refrigerant is cooled, heat is transferred to the boiling liquid dispersion bottoms. The effect is the application of cold and hot loops of a heat pump to condensing dispersion vapors and heating dispersion bottoms, respectively.

In a preferred embodiment, the vaporizable refrigerant in the cold loop of the heat pump is utilized to remotely refrigerate a secondary heat transfer fluid which in turn is recirculated through the condensor for overhead vapors and the receiver for condensate to maintain their temperatures at or below the overheads condensor. In a variation of this embodiment, a further point of application for the recirculating cold heat transfer fluid is at the vent for noncondensables.

In the stripping vapor/liquid contact zone, the concentration of organics in the vapor phase is increased to a concentration above the limit of their solubility in the aqueous medium and thus as condensed overheads are collected in a liquid receiver means the organics coalesce for ready separation as a distinct, liquid layer above or below on the aqueous layer according to their relative densities. Conveniently, separation is accomplished by continuously decanting the superimposed layer as it forms and maintaining the underlying aqueous layer at an appropriate level below the decanting discharge weir by withdrawing the liquid underlayer.

Inasmuch as the decanted aqueous phase is saturated in the organic liquid with which it is in equilibrium, the preferred practice is to recycle the aqueous liquid from this step to the stripping column.

Once separated and recovered, the organics may be further purified for reuse or otherwise disposed as by incineration.

The described process is efficiently applied to the separation of water-immiscible, volatile organics and organic compounds normally liquid at ambient temperatures dissolved in the aqueous medium at or below their solubility limit and characterized by a density differential from water of at least 0.01 at 20° C. and a volatility constant as described below.

The process of the invention may also be applied to systems in which the organics are present in amounts exceeding their solubility limits in water but in such instances the ultimate object will be to reduce the dissolved fraction to desired levels. The system moreover may be used in series with other liquid/liquid separating processes, such as centrifugation, decantation, emulsion breaking, freeze separation and the like unit operations for obtaining physical separation of density differentiated liquids.

The process of the invention is applied to the stripping, and recovery of organics from aqueous media characterized by a volatility constant relative to water, of at least 100, preferably greater than 1,000. This constant is defined by the following thermodynamic equation:

$$\alpha_{cw} = \frac{K_c}{K_w} = \frac{y_c/y_w}{x_c/x_w} = \frac{\gamma_c w P^o_c}{\gamma_w w P^o_w} \quad (1)$$

where
$\alpha_{cw}$ = relative volatility of contaminant (c) to water (w)
K = vapor/liquid distribution coefficient
y = mole fraction in vapor phase at equilibrium
x = mole fraction in liquid phase at equilibrium
sub "c" = contaminant
sub "w" = water
$\gamma_c w$ = activity coefficient of contaminant in water phase
$\gamma w_w$ = activity coefficient of water in water phase
$P^o$ = pure component vapor pressure The relative volatility of the contaminant to water is a general indication of the ease of removing or stripping the contaminant from the water. A relative volatility greater than unity indicates that the contaminant will be enriched in the vapor phase and will therefore preferentially desorb or separate from the liquid body into stripping vapors. The greater the magnitude of the relative volatility, the more readily the contaminant, or mixture of contaminants, can be stripped.

The relative volatility of any contaminating organic phase with respect to water can be calculated by first determining the solubility of the contaminant in water at a given temperature. This solubility is determined by methods well known in the art, such as, by a "cloud point determination". For example, the solubility of toluene in water at 25° C. has been determined to be 566 parts per million by weight, i.e., 111 moles of toluene per million moles of water, $x_c/x_w$.

The second step in calculating relative volatility involves determining the ratio of contaminant to water present in the vapor phase. This ratio may be obtained by methods also well known in the art, such as by the pure component vapor pressure data. For example, the vapor pressure of toluene at 250° C. has been determined to be 29.6 millimeters of mercury. Since the vapor pressure of water at 250° C. is known to be 23.8 millimeters of mercury, the ratio $y_c/y_w = 29.6/23.8$. Substitution of the values obtained for $x_c/x_w$ and $y_c/y_w$ into Equation 1, yields a relative volatility for toluene of about 11,204. Similar calculations can be made for other contaminants to be removed from aqueous media.

Other methods for estimating the relative volatility are available. See Pierotti et al. "Activity Coefficients and Molecular Structure", *Industrial and Engineering Chemistry*, Vol 51, No. 1, Jan. 1959, pp. 95. This article gives a method for estimating activity coefficients in water of organic compounds.

Any means for evacuating vapor from the system will facilitate dispersion boiling. A vacuum is advantageously produced by means of a rotary lobe booster and a liquid ring vacuum pump to avoid the introduction of trace amounts of lubricants and condensed organics into its exhaust.

The process is operated at or near ambient temperature of the liquid dispersion as obtained from the environment or other source such as a manufacturing process stream. In most applications for the present invention, the ambient temperature of the dispersion and thus processing temperature is in the range from 0° to 60° C.

The described process obviates need for external heating means and thus minimizes capital investment in an energy source for producing stripping vapors. Through the use of a heat pump system to transfer heat from the overhead condenser into the reboiler for dispersion bottoms, and keeping the entire system at or near ambient temperature, energy losses to the environment are minimized and the overall energy requirements to remove a quantity of disperse organics is minimized.

Organic materials having a density less than one usefully removed from aqueous media by application in the present invention include hydrocarbons such as: gasoline, benzene, toluene, xylene, hexane, octane and ethylbenzene. Others having a density greater than one are chlorinated solvents such as: trichloroethylene, trichloroethane and perchloroethylene. The contaminants to be stripped are characterized by a volatility constant relative to water of at least 100, and preferably more than 1,000. Examples of hydrocarbons and solvents which have a relative volatility of greater than 1,000 include: benzene (9860), o-xylene (8050), ethylbenzene (13,194), and trichloroethylene (7738).

DESCRIPTION OF INVENTION EMBODIMENT

Figure 1:
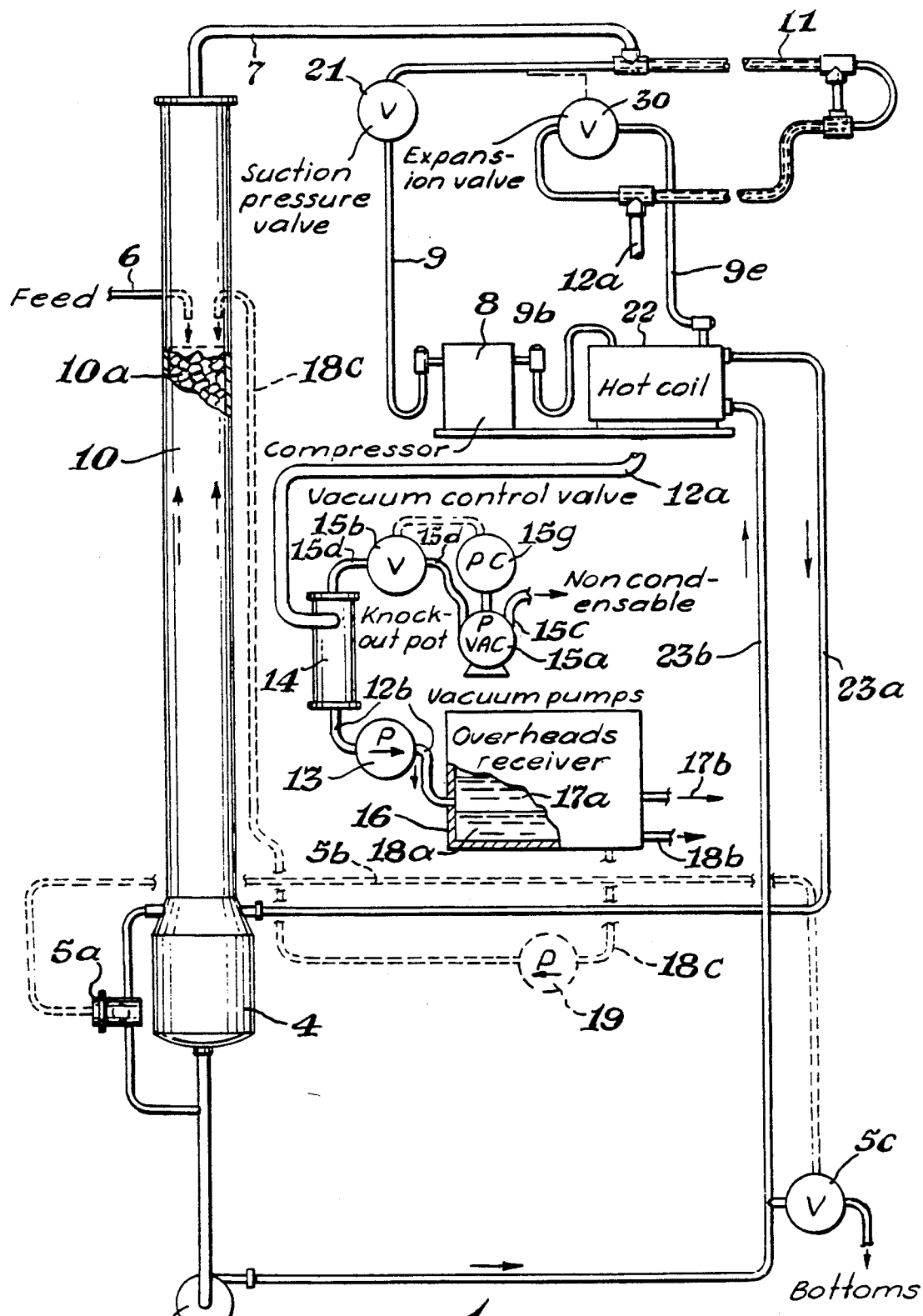
FIG. 1 is a schematic illustration of the invention showing direct application of heat pump hot and cold loops to stripper bottoms and overheads.

Referring to FIG. 1 of the accompanying drawings, the depicted heat pump stripping system for dissolved and highly dispersed organics includes a stripper column 10. The column is depicted with a tower bottom 4. Tower bottom 4 liquid level is controlled by control 5a which pneumatically activates a discharge valve 5c, by pneumatic (air pressure) connection 5b. The column 10 is packed with a commercial ceramic packing 10a. Its height is sufficient to achieve the desired degree of separation as determined by known engineering principles. Groundwater containing volatile, dissolved, water-immiscible organics to be removed is introduced at or near the top of the stripper column 10 through feed line 6. Pressure within the column 10 is reduced by means of vacuum pump 15a. Pressure throughout the overhead cooling and collection system is controlled by pressure control valve 15b in overhead noncondensables line 15d operating in conjunction with pressure control 15g. A vapor vacuum pump of sufficient capacity is used to evacuate overhead vapors that are not condensed and to maintain the desired reduced pressure within the column 10 to keep liquid bottoms boiling at ambient temperature in the tower bottom 4. Desirably this capability is sufficient to reduce and maintain vacuums below about 10 millimeters, preferably 5 millimeters of mercury as may be necessary to maintain the aqueous dispersion at about ambient temperature.

Vapor evolving from column 10 passes through overheads line 7 into a shell and tube heat exchanger 11 cooled on the tube side by refrigerant in line 9. Condensate from the heat exchanger 11, passes through vacuum line 12a into the knock out pot 14.

The knock out pot 14 is interposed in the overheads vacuum line 12a to separate noncondensable overheads with a minimum of entrained liquid condensate. The noncondensables are exhausted through the vacuum pump 15a at discharge 15c. Condensate is pumped by means of liquid pump 13 from the knock out pot 14 through line 12b to an overheads receiver 16 in which the organic and aqueous phases coalesce and separate into distinct layers of organics 17a and aqueous dispersion 18a, which are intermittently withdrawn through organics discharge line 17b and aqueous dispersion discharge line 18b respectively. Optionally the condensed aqueous dispersion 18a is recycled to the column 10 through line 18c by means of pump 19.

In the refrigerant loop, a refrigerating fluid is liquefied by compression in vapor compressor 8 and passed into a hot coil exchanger 22 wherein it undergoes indirect heat exchange with bottoms from the tower bottom 4 recirculated through lines 23a and 23b by means of pump 24. The condensed liquid refrigerant passes through expansion valve 30 into the shell and tube heat exchanger 11 wherein the compressed refrigerant expands, i.e., vaporizes to indirectly cool the condensing overhead vapors from column 10.

In operating the foregoing system, an aqueous system containing a trace amount of water-immiscible, suspended or dissolved liquid organics characterized by a density of less than one, which in sufficient concentration, forms a water-immiscible phase in water is introduced as feed to the top of the column 10 at ambient temperature. An example of such feed is gasoline contaminated groundwater. The organic materials in such feed are characterized by a volatility relative to water greater than 1,000 and in this illustration a density sufficiently less than one to promote ready separation into organic and aqueous layers. Pressure within the column is maintained at a reduced level by means of vacuum pump 15a to cause the aqueous dispersion to boil at ambient temperature. Vapor production in the tower 10 is augmented as a result of heat absorbed from the recompressed refrigerant condensing in the hot coil 22. The overhead vapors from the stripper column 10, enriched in the disperse organic phase pass through overhead line 7 into the shell and tube heat exchanger 11 wherein there they condense on the cold line and thence flow by gravity into the knockout pot 14. From the knock out pot 14, condensed liquid is pumped into the overhead receiver 16 which facilitates coalescing and decanting of the supernatant organic phase 17a which is discharged through line 17b. Ultimately the organic phase may be further processed for reuse or destroyed as by incineration. Aqueous dispersion bottoms 18a may be recycled to stripper column 10 through line 18c by means of liquid pump 19 or discharged through line 18b.

By operating the system at the ambient temperature of the feed and discharging stripped bottoms at or about ambient temperature, the potential for energy loss to the environment is minimized. Energy input is largely limited to that required for recycling refrigerant through the compressor 8 and maintaining the system at its boiling point by application of a vacuum by means of vacuum pump 15a.

In a preferred embodiment, a process is provided for efficiently stripping an aqueous medium containing dissolved volatile organics having a volatility relative to water greater than 100 which involves three-point application of the heat pump's cold loop and heating of tower bottoms in its hot loop outside the tower.

Figure 2:
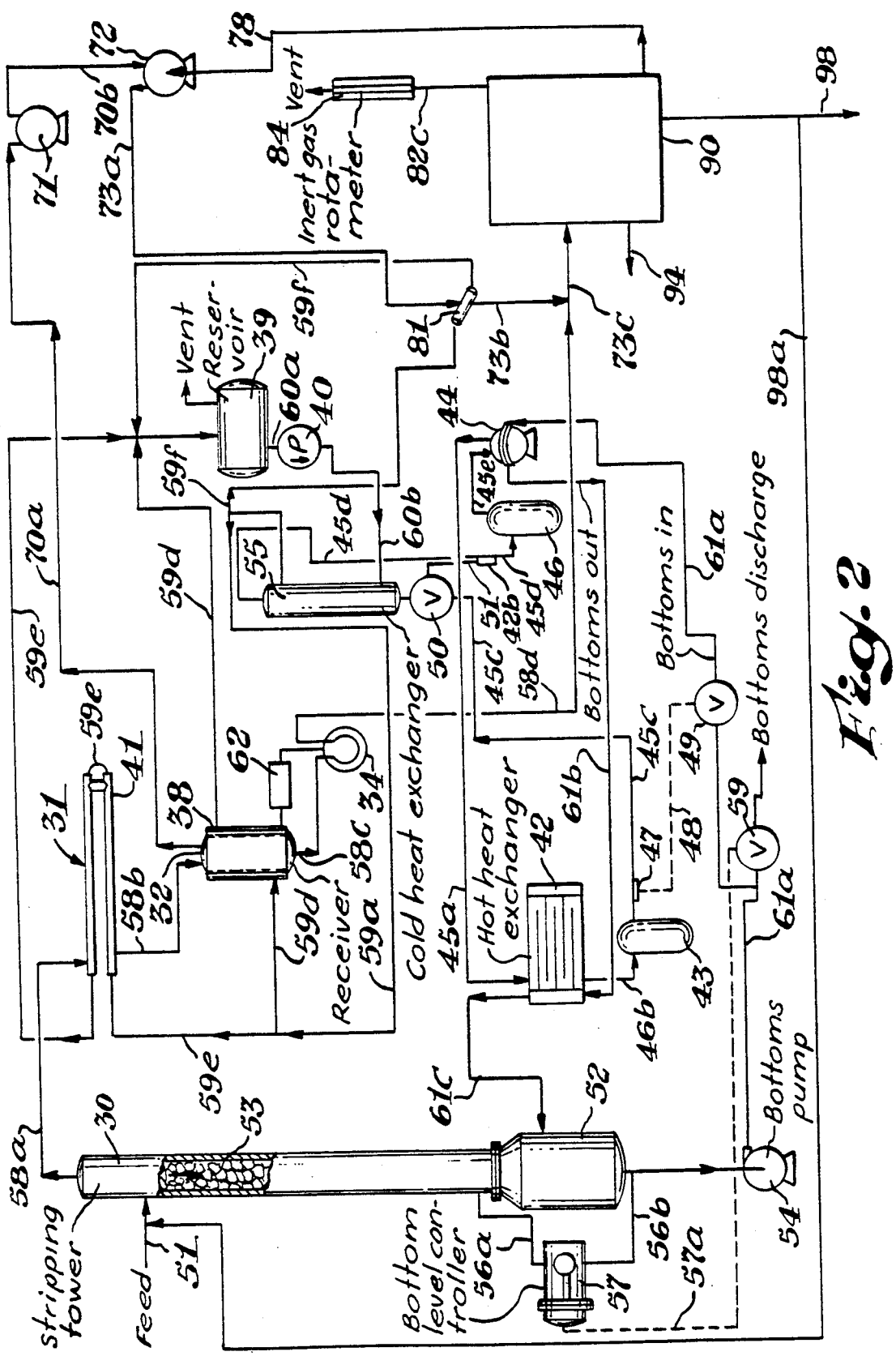
FIG. 2 is a schematic illustration of the invention with multipoint indirect cooling from the cold side of a heat pump using an intermediate heat transfer fluid indirectly cooled by a vaporizing refrigerant in the cold loop of a heat pump and heating of bottoms outside the stripper column in the hot loop of the heat pump.

For a description of this system, refer to FIG. 2 of the accompanying drawings. A stripping tower 30 packed with a Koch Flexipac II packing 53 is depicted with a tower bottom 52 and a bottoms level controller 57 connected to the tower bottom 52 through piping 56a and 56b. A pneumatic connection 57a with the bottoms level controller 57 controls pneumatically operated discharge valve 59. Overhead vapors from the stripping tower 30 pass into an overheads shell-tube condensor 31 through overheads line 58a. The condensed overheads drain by gravity into receiver 32 through condensate line 58b. Receiver 32 has a cooling jacket 38. Condensate is removed from receiver 32 through line 58c by means of a peristaltic pump 34, which discharges into a three-phase separator 90 through line 58d. The three-phase separator 90, more fully detailed in FIG. 3, operates at atmospheric pressure. The pump 34 is electrically actuated by level controller 62. The amount of condensate recovered at receiver 32 varies with the temperature achieved in cooling effluent from the overheads condensor 31. Since the receiver is in the vacuum line, liquids may flash through the noncondensing overheads line 70a and thence into the vacuum pump system.

Vacuum line 70a connects to a series vacuum pump system comprising Busch vacuum pump 71 in series through vacuum line 70b with a liquid ring vacuum pump 72. The ring coolant and discharge of noncondensable vapors, as well as small amounts of entrained water and organic vapors proceed through line 73a into sealant cooler 81 where final condensation occurs at atmospheric pressure. Cooler 81 is a conventional, shell-tube heat exchanger insulated to minimize heat gain from the environment. The liquid condensate proceeds through line 73b to the three-phase separator 90 in which an aqueous phase and a coalesced organic phase are separated.

Figure 3:
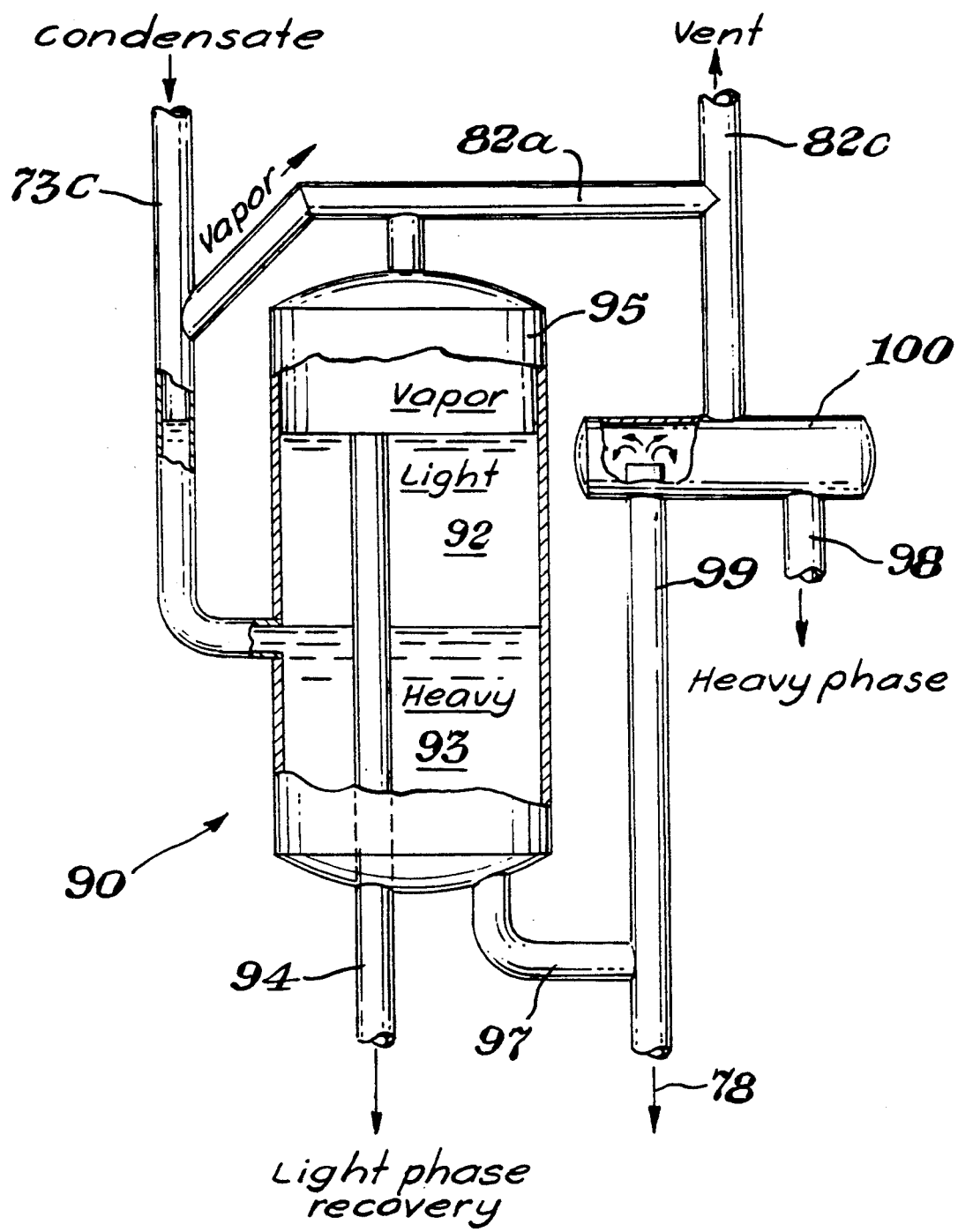
FIG. 3 depicts a three-phase separator for gravity separation of light and heavy liquid phases and venting noncondensables.

Referring to FIG. 3, the three-phase separator comprises a decanting vessel 95 and a venting vessel 100. When separating an organic liquid of a density less than water, the lighter supernatant organic phase 92 discharges through standpipe 94. The heavier aqueous phase 93 is discharged from the venting vessel 100 through drain line 98 or alternatively recycled to feed line 51 through line 98a. The decanting vessel 95 is connected to the venting vessel through drain line 97 which feeds standpipe 99 of sufficient height to balance the head maintained in the decanting vessel 95.

Optionally, a portion of the aqueous phase 93 is returned to the liquid ring vacuum pump 72 through liquid ring line 78, as depicted in FIG. 2. Noncondensable inert gases that may evolve from the aqueous phase 93 in venting vessel 100 are discharged through line 82c.

An overflow weir 99 in venting vessel 100 removes the heavy liquid water phase from the venting vessel 100, which operates near atmospheric pressure.

Returning to FIG. 2, summarily tracing the flow and disposition of the overheads condensate stream 58b, the aqueous medium ultimately discharges at drain line 98. Discharge of the organic phase occurs at line 94 from the three-phase separator 90. Inert gases entrained or dissolved in the feed stream exit the system at the inert gas rotometer 84. Optionally the aqueous phase from drain line 98 is recycled to tower 30 (not depicted).

The applications of the heat pump cold and hot loops are described next. The energy input to the heat pump system occurs at the water-cooled compressor 44 which receives and discharges cooling liquid through lines 61a and 61b respectively, which deliver bottoms from tower bottom 52 to the cooling coil of the refrigeration compressor 44 and thence to the tube side of a heat exchanger 42 consisting of a shell and tube heat exchanger. Tower bottoms are passed through the hot heat exchanger 42 and returned to the tower bottom 52 through line 61c. The rate of bottoms recirculation through the compressor 44 and hot heat exchanger 42 is controlled by means of valve 49 which in turn is operated by a pressure sensor 47 in refrigerant delivery line 45c through which liquid refrigerant passes into a cold heat exchanger 55 through expansion control valve 50. Valve 50 is directly connected to temperature sensor 42b in the evaporator refrigerant line 45d, which controls compressed refrigerant feed to cold heat exchanger 55. This is the first stage of the heat pump's cold loop. The cold heat exchanger 55 refrigerant vapor line 45d connects to a suction line accumulator 46 from which vapor is withdrawn through line 45e into the compressor 44. The compressor 44 discharges compressed refrigerant vapor through line 45a into the hot heat exchanger 42 on its shell side. By these means, energy is delivered to recirculating bottoms from tower bottom 52 thus augmenting the vapor generation and the stripping rate within the stripping tower 50.

In the cold loop of the heat pump system, a cooling effect is delivered from expanding, i.e., vaporizing refrigerant, in the indirect evaporator (cold heat exchanger 55) to cool a heat transfer liquid. The cooled heat transfer liquid is circulated to three points in the overheads processing stream, i.e., the overheads condensor 31, condensate receiver cooling jacket 38 and the sealant cooler 81. The heat transfer liquid is delivered to the overheads condensor 31 and receiver 32 through heat transfer liquid line 59a which divides between line 59e and 59d to deliver coolant to the overheads condensor 31 and receiver cooling jacket 38 respectively. Heat transfer coolant exits from receiver cooling jacket 38 through a continuation of line 59d and from the overheads condensor through a continuation of line 59e. They are ultimately recombined and passed into an insulated heat transfer liquid reservoir 39 which in turn supplies heat transfer liquid to a circulation pump 40 discharging to the shell side of the cold heat exchanger 55 through line 60b. Most of the overhead vapors are condensed in condensor 31 and thence collected in receiver 32 which is pumped through line 58c by means of peristaltic pump 34. Discharge from this pump is directed to the three-phase separator 90 through line 58d.

Vacuum is maintained on the entire system including the stripping tower overheads condensor 31 and receiver 32 through line 70a. This is achieved by means of an oil-sealed rotary vane vacuum pump 71 and a two-stage liquid ring vacuum pump 72 discharging noncondensables and some condensable vapor to the sealant cooler 81 essentially at atmospheric pressure through line 73a. Vapor from the sealant cooler 81 goes out line 82a. Aqueous and organic phases go down line 73b into the three-phase separator system 90.

The system depicted by FIGS. 2 and 3 was used to resolve series of aqueous dispersions containing toluene at an initial concentration of about 500 ppm. The temperature of the toluene containing dispersion was about 14° C. The feed was introduced into the stripping tower 50 which was 4 inches in diameter and 19.5 feet high packed with 13.5 feet of Koch Flexipac II structured tower packing 53. Six feet of liquid disengagement space was provided between the top of the packing 53 and the top of the tower 30. The liquid in the tower bottom 52 is heated in the hot heat exchanger 42 of the heat pump system. Control valve 59 controlled the liquid level in the tower bottom 52 through the discharge of bottom liquid stripped toluene dispersion, to a special waste treatment sewer.

Vacuum was maintained by a vapor pumping system comprising a Busch oil seal rotary vane vacuum pump 71 followed in series by a Croll-Reynolds, two-stage liquid ring vacuum pump 72 which together provided a sufficient evacuation rate for the tower 30 to achieve internal pressures down to 5 millimeters of mercury when the vessel was empty. With such vacuum capability, the hot coil produced rapid boiling of the aqueous dispersion in the tower 30. The liquid ring pump pushes uncondensed overhead vapors and its own water sealant to the shell side of a sealant cooler 81. By discharging the noncondensables at lower temperatures, potential losses of toluene to the atmosphere through the rotometer 84 for noncondensables are minimized.

The three-phase separator 90 comprising decanting vessel 95 with standpipe 94 provides sufficient residence time to allow coalescence and separation of organic 92 and aqueous phase 93. The underlayer of aqueous phase 93 may be recirculated to the liquid ring vacuum pump 72 as recycle.

Figure 4:
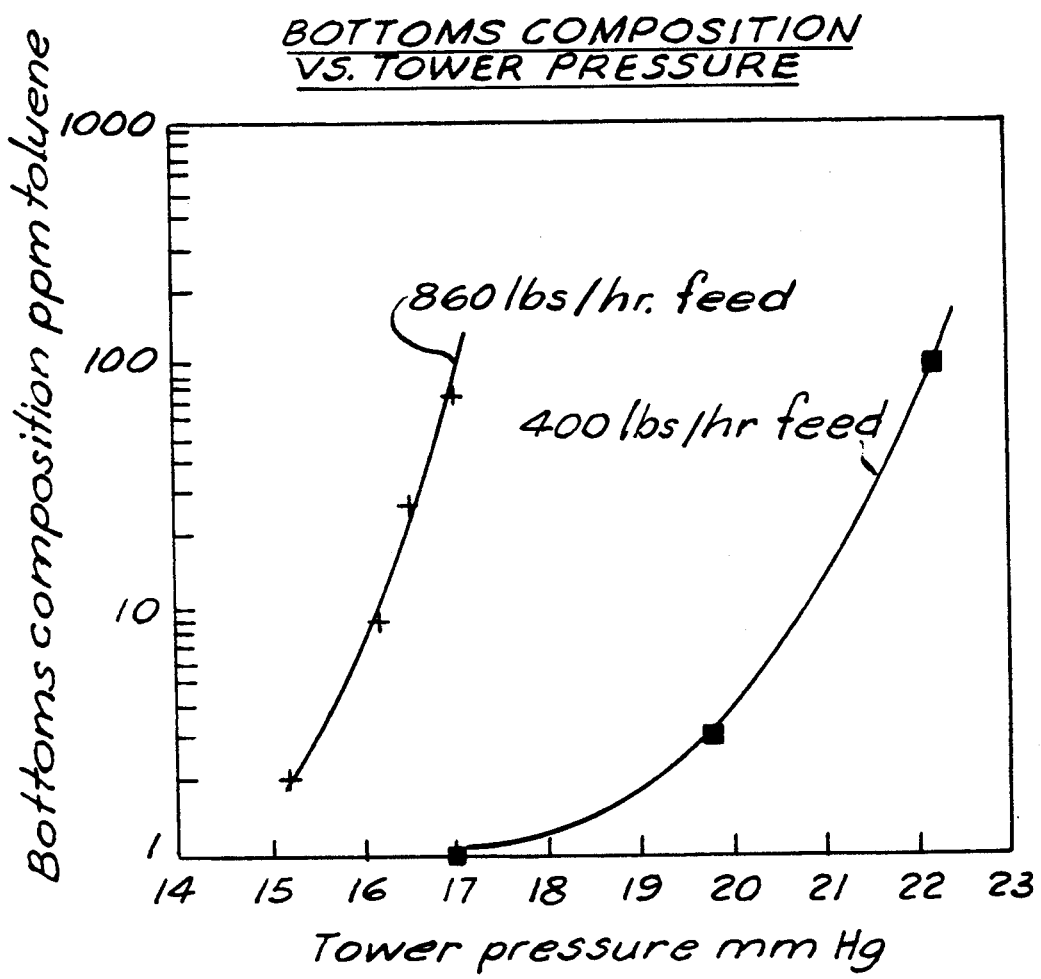
FIG. 4 is a representation of data on separation efficiencies for a given organic liquid as a function of tower pressure.

In several test operations, feed concentrations containing approximately 500 ppm of toluene at a constant temperature of about 14° C. were introduced into the stripping tower 30. The tower pressure and feed rate were varied to test the separation efficiencies at several loadings. The vacuum ranged from 10–25 millimeters of mercury absolute and experimental feed rates were maintained at 860 and 400 pounds per hour respectively. Samples of the feed and bottoms were taken throughout the runs to verify steady state conditions. Results of these runs are depicted in FIG. 4 as a function of bottoms composition versus tower pressure. Manifestly as tower pressure in the range of 14 to 17 millimeters of mercury was achieved, high removal efficiencies were achieved.

What is claimed is:

1. A process for separating water-immiscible, volatile organic liquid present as a dissolved trace in an aqueous dispersion which comprises:
   (a) Reducing the press on the aqueous dispersion within a stripping vessel at ambient temperature of the aqueous dispersion at a temperature within the range of 0°–60° C. sufficiently to cause boiling said water-immiscible, volatile organic liquid having a relative volatility to water of at least 1000 and a density differentiated from water at 20° C. by at least 0.01,
   (b) Contacting the vapor from said boiling dispersion counter-currently with an incoming feed stream of the aqueous dispersion, the contacting zone being of sufficient length to produce relative enrichment of the vapors in organic content,
   (c) Cooling the vapor effluent from the contacting zone from step (b) in a condensing heat exchanger cooled directly or indirectly to below ambient temperature with an evaporative refrigerant in the cold loop of a heat pump,
   (d) Heating the aqueous dispersion with a compressed evaporative refrigerant in the hot loop of the heat pump to enhance dispersion boiling,
   (e) Collecting condensate of dispersion vapor,
   (f) Coalescing aqueous and organic phases of the condensate,
   (g) Separating immiscible organic and aqueous phases formed in step (f) to recover the organic liquid.

2. A process as in claim 1 including additional step of recycling the aqueous phase separated at step (g) to the stripping vessel in step (a).

3. A process as in claim 1 wherein the contacting in step (b) is conducted counter-currently in a vessel comprising a packed stripping column.

4. A process as in claim 1 wherein the cooling of the vapor effluent from the stripping vessel is achieved by a recirculating heat transfer liquid indirectly cooled by the cold loop of a heat pump with a heat transfer fluid and the heating of aqueous dispersion bottoms is achieved by indirect heat exchange with the hot loop of the heat pump.

5. A process as in claim 4 wherein a heat transfer liquid is applied at a first heat exchanger to achieve initial condensation of the overhead vapors and at the receiver for the condensate to reduce flashing across a vacuum system.

6. A process as in claim 5 wherein the heat transfer liquid is applied to cool vapor efficient from a vacuum pump at atmospheric pressure.

* * * * *

UNITED STATES PATENT AND TRADEMARK OFFICE
CERTIFICATE OF CORRECTION

PATENT NO. : 5,294,303

DATED : March 15, 1994

INVENTOR(S) : Lanny A. Robbins

It is certified that error appears in the above-indentified patent and that said Letters Patent is hereby corrected as shown below:

On the title page, item [54] and column 1, line 3, "AM" should read --AN--.

Col. 9, Claim 1, line 30, "press" should be -- pressure --.

Col. 9, Claim 1, line 33, following "boiling" should be -- , --.

Col. 10, Claim 2, line 17, following "including" should be -- an --.

Col. 10, Claim 6, line 36, "efficient" should read -- effluent --.

Signed and Sealed this

Twenty-fifth Day of October, 1994

Attest:

BRUCE LEHMAN

Attesting Officer     Commissioner of Patents and Trademarks